US007055150B2

(12) United States Patent
Terada et al.

(10) Patent No.: US 7,055,150 B2
(45) Date of Patent: May 30, 2006

(54) PRINTER FIRMWARE INSTALLATION METHOD, PRINTER AND PRINTER SYSTEM

(75) Inventors: Hirotomo Terada, Kawasaki (JP); Yoshinobu Nakamura, Kawasaki (JP); Kota Ariyama, Kawasaki (JP); Hiroaki Katoh, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 600 days.

(21) Appl. No.: 09/987,016

(22) Filed: Nov. 13, 2001

(65) Prior Publication Data
US 2003/0020938 A1    Jan. 30, 2003

(30) Foreign Application Priority Data
Jul. 12, 2001  (JP)  ............................. 2001-212523

(51) Int. Cl.
G06F 9/445  (2006.01)
(52) U.S. Cl. ..................... 717/178; 358/1.15; 358/1.16
(58) Field of Classification Search ........ 717/168–178; 358/1.13–1.16
See application file for complete search history.

(56) References Cited

U.S. PATENT DOCUMENTS 5,239,621 A * 8/1993 Brown et al. ............ 358/1.16
6,070,012 A * 5/2000 Eitner et al. .............. 717/168
6,230,319 B1 * 5/2001 Britt et al. ................ 717/173
6,388,763 B1 * 5/2002 Han .......................... 358/1.16
6,622,246 B1 * 9/2003 Biondi ....................... 713/100
6,678,741 B1 * 1/2004 Northcutt et al. ........... 709/248
6,681,392 B1 * 1/2004 Henry et al. ................ 717/176
2003/0188303 A1 * 10/2003 Barman et al. .............. 717/170
2004/0015952 A1 * 1/2004 Lajoie et al. ................ 717/171

FOREIGN PATENT DOCUMENTS

| JP | 5-61785 | 3/1993 |
| JP | 11-85637 | 3/1999 |
| JP | 11-143655 | 5/1999 |
| JP | 2000-158762 | 6/2000 |

* cited by examiner

Primary Examiner—Kakali Chaki
Assistant Examiner—Trenton Roche
(74) Attorney, Agent, or Firm—Westerman, Hattori, Daniels & Adrian, L.L.P.

(57) ABSTRACT

An install apparatus installs printer firmware to a printer through a network in the background of normal print jobs. The Printer (4) includes a storage means (22) to store the firmware consisting of a plurality of blocks, and a processing means (20) for receiving the blocks to store to storage means (22). In case an interruption occurs during the firmware installation and at the time of resuming the installation, the processing means (20) informs install apparatus (6) of a guarantee range of the installed blocks being determined from the data stored in storage means (22). The install apparatus then restarts transferring the firmware from the succeeding transfer block of the guarantee range.

19 Claims, 15 Drawing Sheets

| Start up firmware information | Use/Non-Use |
|---|---|
| Firmware version | Version data |
| All transfer block number | N |
| Received block number | 1 |
| Guaranteed block number | J |
| Transfer block 1 | Byte number, check data |
| Transfer block 2 | Byte number, check data |
| Transfer block 3 | Byte number, check data |
| ⋮ | ⋮ |
| Transfer block N | Byte number, check data |

| Storage area for transfer block 1 |
| Storage area for transfer block 2 |
| Storage area for transfer block 3 |

⋮

| Storage area for transfer block N |

FIG. 14

| Version | All transfer block number | Transfer block 1 | Byte number | Check data | Firmware entity 1 |
|---|---|---|---|---|---|

| Transfer block 2 | Byte number | Check data | Firmware entity 2 |
|---|---|---|---|

| Transfer block 3 | Byte number | Check data | Firmware entity 3 |
|---|---|---|---|

· · ·

| Transfer block N | Byte number | Check data | Firmware entity N |
|---|---|---|---|

PRINTER FIRMWARE INSTALLATION METHOD, PRINTER AND PRINTER SYSTEM

BACKGROUND OF THE INVENTION

1. Field of the Invention

The present invention relates to a printer and a printer system to which firmware is installed in network environment and a method therefor.

2. Description of the Related Arts

Network systems that connect personal computers, servers and various types of peripheral equipment via a network are used to a large extent today. There are employed LAN (local area network) and/or WAN (wide area network) in such networks.

Printers for the purpose of connecting and utilizing in network environment are available in the market. Such a printer is provided with a printer engine and a controller. The controller is constituted by hardware based on a processor. To realize control function, firmware (control program) is included in the controller.

Normally, the firmware is installed in the printer before shipment from a manufacturing factory. However, there are cases that the version-up of the firmware is conducted so as to correct program errors or upgrade functions. In such a version-up of the firmware, for a network-connected printer, it becomes widely used to install new firmware using network environment. Use of network enables easy installation operation as well as easy installation for multiple printers.

Moreover, remote maintenance services for electronic equipments including printers also become widely used. Under such circumstances, automatic firmware installation through the network has also been introduced when upgrading firmware version is necessary.

Conventionally, even in such a case of automatic installation, an operator (i.e. user) must be aware of the installation in progress. The operator encounters restrictions to follow: First, use of the printer must be suspended during the installation, or the operator must wait for the installation completion to use the printer for other jobs. Secondly, once the installation is started, the installation cannot be interrupted (by power switch off or the like) on the half way.

When any of these restrictions is not satisfied and the installation has not been completed, for example due to switching off the power manually on the half way of the installation, it is not possible to judge what extent the writing a memory of the printer by the installation has been carried out. As a result, installing the entire firmware afresh is necessary when re-installing.

Therefore, there are following problem to be improved in a conventional art.

(1) When a large volume of firmware is installed to the printer, the firmware installation of the printer requires a long time. During the installation, the printer cannot be used for other jobs until the installation is completed. And an operator cannot end the printer-job of the day on the half way of the installation.

(2) When remote maintenance is being carried out from a remote location, an operator at the printer cannot recognize the installation easily and may switch off the printer power. If this happens it becomes impossible to continue the installation.

(3) In recent years the remote maintenance becomes in use more widely. It is desired to perform automatic installation in the background of the usual printer-job, while an operator continues the usual job without need of recognizing the installation is in progress.

SUMMARY OF THE INVENTION

Accordingly, it is an object of the present invention to provide a printer, a printer system and a method for installing a printer firmware automatically in the background of normal jobs that use the printer.

It is another object of the present invention to provide a printer, a printer system and a method for installing a printer firmware automatically even though an operator does not recognize the installation.

It is still another object of the present invention to provide a printer, a printer system and a method for installing a printer firmware with an automatic resumption of installation through a printer operation by an operator even when the installation has been interrupted.

According to the present invention, there is provided a printer firmware installation method by which firmware is installed from upper-level apparatus to a printer through a network. The method comprises the steps of; receiving each block of the firmware consisting of a plurality of blocks; storing each received block to a storage unit; deciding a guarantee range of the installed blocks by using the data stored in the storage unit when the installation is resumed after an interruption occurs during installation; and informing the decided guarantee range to the upper-level apparatus.

Further, according to the present invention, a printer comprises a storage unit for storing a firmware; a communication unit for receiving each block of the firmware consisting of a plurality of blocks from the upper-level apparatus; and a processing unit for processing the received block and storing the processed received block into the storage unit. The processing unit decides a guarantee range of the installed blocks by using a data stored in the storage unit when the installation is resumed after an interruption occurs during installation, and informs the decided guarantee range to the upper-level apparatus.

Still further, according to the present invention, there is provided a printer system which comprises a printer for printing according to a print instruction received through a network; and upper-level apparatus for installing firmware to the printer through the network. The printer comprises a storage unit for storing the received firmware consisting of a plurality of blocks; a communication unit for receiving each block of the firmware from the upper-level apparatus; and a processing unit for processing the received block and storing the processed received block into the storage unit. The processing unit decides a guarantee range of the installed blocks by using a data stored in the storage unit when the installation is resumed after an interruption occurs during installation, and informs the decided guarantee range to the upper-level apparatus. And the upper-level apparatus restarts to install the firmware from the succeeding transfer block of the guarantee range.

In the printer to which firmware is installed, when the interruption occurs during the installation, the guarantee range of the received data is automatically detected in the printer to report to the installation tool side. This enables to interrupt and resume the installation work without awareness by the operator. Accordingly, the operator can use the printer for normal jobs at any time and can switch the printer power on and off whenever necessary. Also, even the installation is interrupted due to these operations, the firmware having been installed before the interruption can be used effectively, enabling to shorten the time for re-installation.

According to the present invention, preferably the printer firmware installation method further comprises the step of installing the firmware to the printer from the succeeding transfer block of the guaranteed range of the installation blocks. Accordingly, the firmware having been installed correctly before the interruption need not be transferred again, enabling reduced network occupation time when the interruption occurs.

Further, according to the present invention, preferably the reception step comprises a step of receiving firmware management information and each block of the firmware entity, and the decision step comprises a step of deciding a guarantee range of the installed blocks using the received management information and data stored in the storage unit. Accordingly, the printer can easily decide the guarantee range of the blocks having been installed using the received management information.

Still further, according to the present invention, preferably the reception step comprises a first reception step of receiving the firmware management information and a second reception step of receiving each block of the firmware entity, and the decision step comprises a step of deciding a guarantee range of the installed blocks using the received management information and data stored in the storage. Because the management information is sent separately from the firmware entity, the printer can receive the management information in a simple manner to decide the guarantee range.

Still further, according to the present invention, preferably the reception step comprises a step of receiving blocks each consisting of firmware management information on each firmware block and the firmware block, and the decision step comprises a step of deciding a guarantee range of the installed blocks using the firmware management information extracted from each received block and data stored in the storage unit. Because the management information and each block of the firmware entity are transferred integrally, the transmission time can be reduced.

Still further, according to the present invention, the printer firmware installation method further comprises the steps of informing an installation interruption signal to the upper-level apparatus from the printer; and informing an installation resumption signal to the upper-level apparatus from the printer. This enables the printer to control interruption and resumption of the installation actively, and the installation can be carried out as a background job while conducting a print job.

Still further, according to the present invention, the interruption step comprises the step of informing the installation interruption signal to the upper-level apparatus in accordance with that the printer detects that print data is received through the network and starts to print the print data. This enables to continue the installation while affording priority on the print operation ordered by a print host. Thus the inherent print operation can be maintained during the installation performed in background.

Still further, according to the present invention, the interruption step comprises the step of informing the installation interruption signal to the upper-level apparatus in accordance with that the printer detects that the printer is operated by an operator and performs a processing corresponding to the printer operation. This enables to continue the installation while affording priority on the operator's operation onto the printer. Thus the inherent print operation can be maintained during the installation performed in background.

Further scopes and features of the present invention will become more apparent by the following description of the embodiments with the accompanied drawings.

BRIEF DESCRIPTION OF THE DRAWINGS

FIG. 6 shows a diagram illustrating an installation information table according to the first and a second embodiments of the present invention.

FIG. 7 shows a diagram illustrating an installation area according to the first and a second embodiments of the present invention.

FIG. 14 shows a diagram illustrating firmware format according to a second embodiment of the present invention.

DETAILED DESCRIPTION OF THE PREFERRED EMBODIMENTS

The preferred embodiments of the present invention are described hereinafter in the order of a printer system, a first and a second embodiment and the other embodiments, referring to the charts and drawings, wherein like numerals or symbols refer to like parts.

[Printer System]

Figure 1:
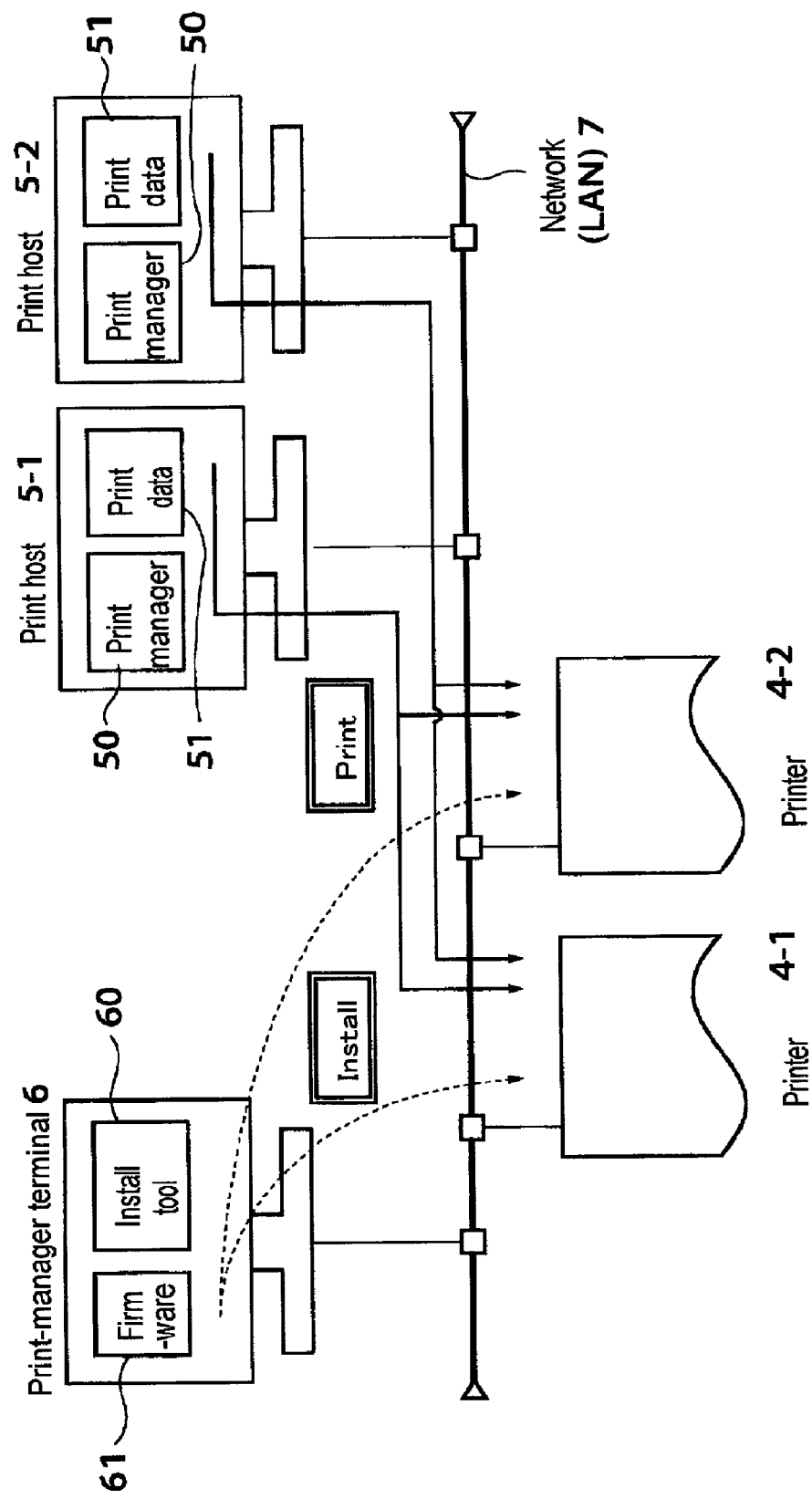
FIG. 1 shows a configuration diagram of a network system according to an embodiment of the present invention.
Figure 2:
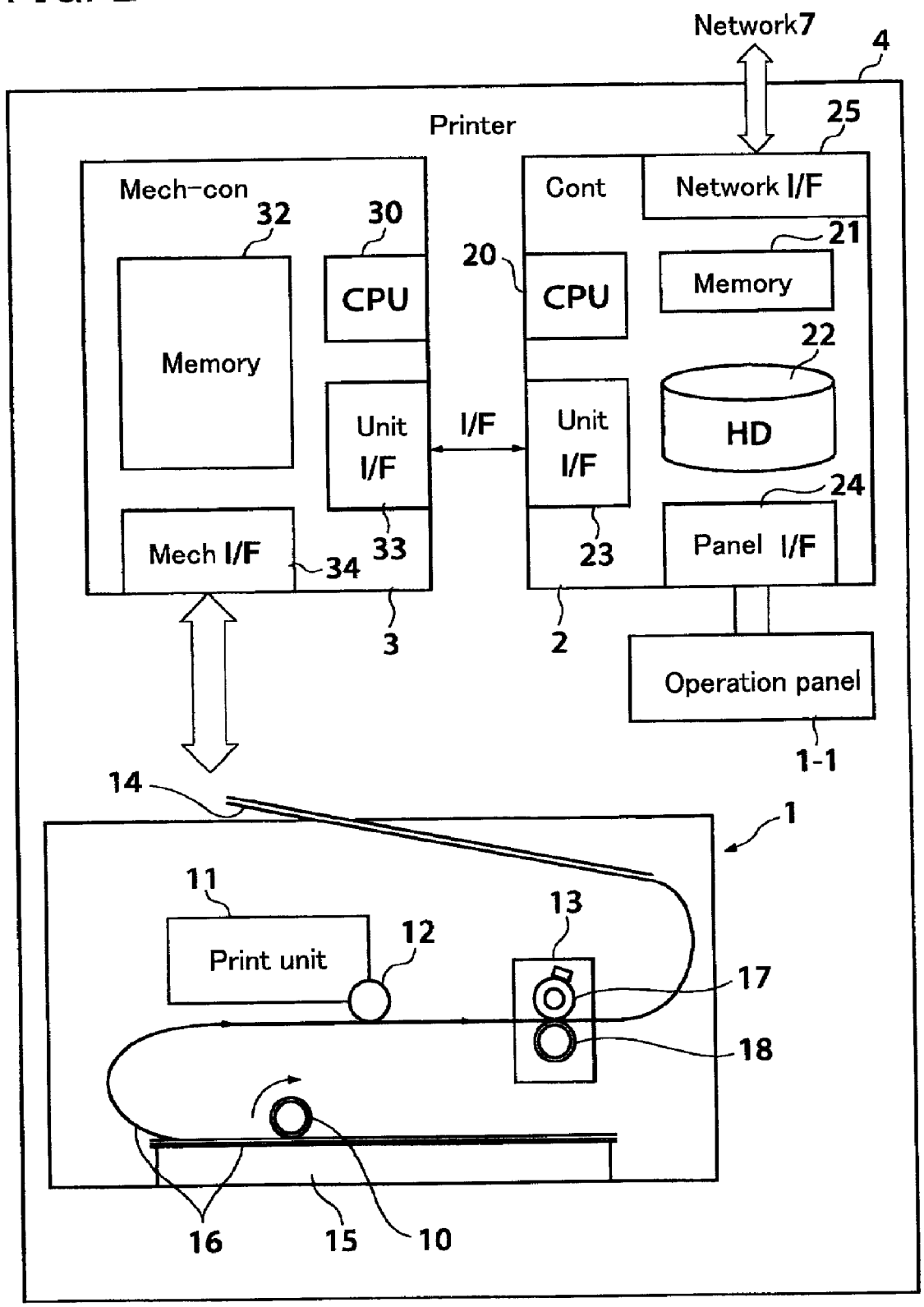
FIG. 2 shows a diagram of a printer configuration shown in FIG. 1.
Figure 3:
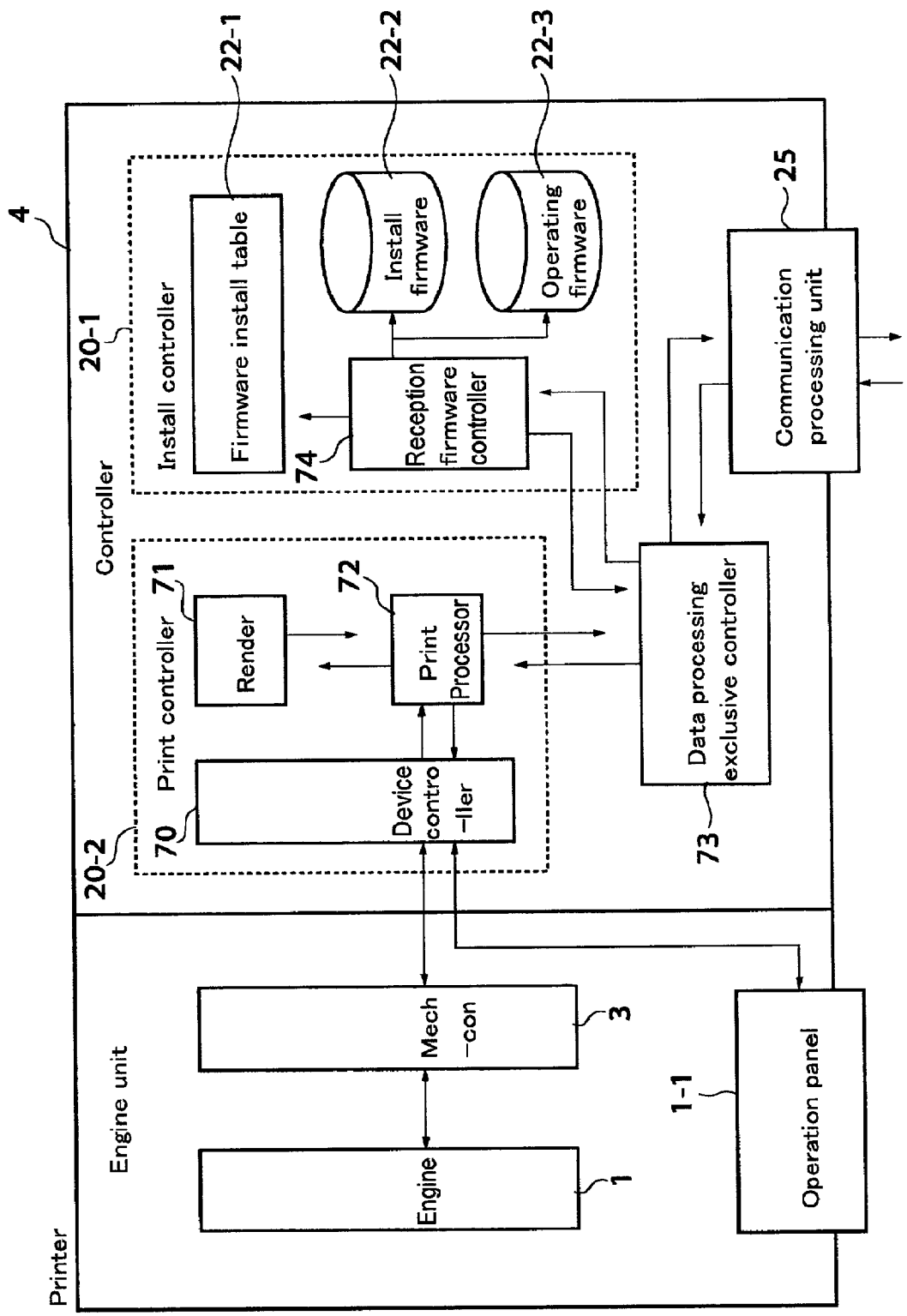
FIG. 3 shows a functional block diagram of the printer shown in FIG. 2.
Figure 4:
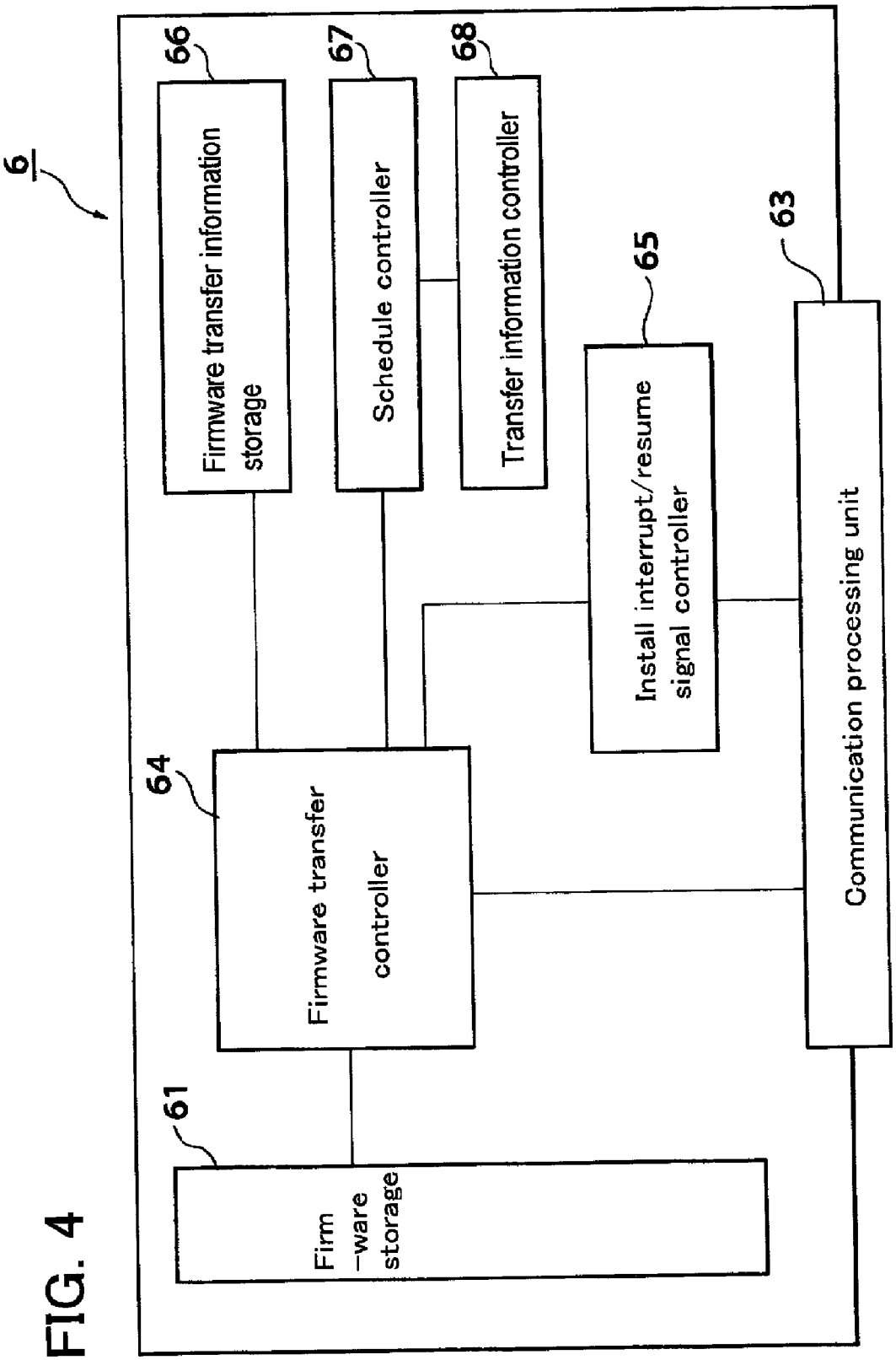
FIG. 4 shows a functional block diagram of a printer management terminal shown in FIG. 1.

In FIG. 1, there is shown a configuration diagram of a network system (printer system) according to an embodiment of the present invention. FIG. 2 shows a block diagram of a printer shown in FIG. 1. FIG. 3 shows a functional block diagram of the printer shown in FIG. 2. FIG. 4 shows a functional block diagram of a printer management terminal shown in FIG. 1.

As shown in FIG. 1, a plurality of printers 4-1, 4-2 and a plurality of print hosts 5-1, 5-2 such as personal computers and a printer management terminal 6 are connected to a network (for example, a Local Area Network (LAN)) 7. Each print host 5-1, 5-2 is provided a print manager 50 including a printer driver, etc, to transmit print data 51 to the printers 4-1, 4-2 through the network 7 to print, under the control of print manager 50.

The printer management terminal 6 includes, for example, a personal computer to conduct consumable goods (such as paper, toner, and cartridges) management and error management of the printers 4-1, 4-2. The printer management terminal 6 is provided an installation tool 60 to install firmware 61 into the printers 4-1, 4-2 through the network 7.

Now, the printers 4-1 and 4-2 (4) are illustrated referring to FIG. 2. The printer 4 (4-1, 4-2) includes a controller unit 2, a mechanism controller unit 3, a printer engine 1 and an operation panel 1-1.

The mechanism controller unit 3 receives control commands and data (print order, print data, etc.) from the controller unit 2 to control the printer engine 1. The controller unit 2 generates control commands and data according to the requests from the hosts 5-1, 5-2 and the operation panel 1-1, and transmits the commands and the data to the mechanism controller unit 3.

The printer engine 1 is constituted by an electrophotography mechanism which includes a print unit 11 having a photosensitive drum 12, a heat roller fixer 13, a paper feed tray 15, a paper feed roller 10 and a stacker 14. By means of a known electrophotographic art, the print unit 11 exposes a print data to the photosensitive drum 12 to form an electrostatic latent image onto the photosensitive drum 12, develops the latent image by a developer to transfer the latent image to a toner image on the photosensitive drum 12 and then transfers the toner image onto a sheet 16.

After the sheet 16 in the paper feed tray 15 is picked up by the paper feed roller 10 and is fed to the print unit 11, the sheet is transferred the toner image in the print unit 11. The toner image transferred on the sheet 16 is heat-fixed by the heat fixer 13 and then the sheet 16 is ejected to the stacker 14. This heat fixer 13, while sandwiching the sheet 16 having the toner image thereupon by a heat roller 17 and a backup roller 18, carries the sheet 16 to transfer heat energy thereupon, thus the toner image on the sheet 16 is solved and fixed.

The mechanism controller 3 controls operations of the printer engine 1. In this printer 4, a controller is constituted by the controller unit 2 (unit #1) and the mechanism controller 3 (unit #2), each being configured with a separate board (printed board).

The controller unit 2 includes a CPU (processor) 20, a memory 21, a non-volatile storage 22 such as a hard disk drive unit (HDD), an interface 23 to the mechanism controller 3, an interface 24 to the operation panel 1-1, and a network (LAN) interface 25 for network communication.

The mechanism controller 3 includes a CPU (processor) 30, a memory 32, an interface 33 to the controller unit 2, and an interface 34 to the printer engine 1.

A control program (firmware) is stored in the non-volatile storage 22 in the controller unit 2. Another control program (firmware) is stored in the memory 32 of the mechanism controller unit 3. The interfaces 23, 33 provide bi-directional interfaces between the controller unit 2 and the mechanism controller unit 3.

In the storage (hard disk, flash memory, etc.) 22 of the printer 4, there are provided a storage area for firmware currently being executed and a storage area for firmware to be installed. Installation information tables are also provided for each firmware to store the information on which firmware is for use when starting up the printer and to manage the installation status.

Referring to FIG. 3, more detailed description is given below. From a functional viewpoint, the controller 2 includes an installation controller 20-1, a print controller 20-2, and a data processing exclusive-control part 73. The print controller 20-2 comprises an equipment controller 70, a rendering part 71, and a print processor 72.

The equipment controller 70 controls the mechanism controller 3 and the operator panel 1-1, and also controls the printer engine 1 on receiving a print request from the print processor 72 through the mechanism controller 3. The equipment controller 70 sends completion of printing by the printer engine 1 to the print processor 72. Similarly, the equipment controller 70 informs it to the print processor 72 that the operator panel 1-1 is in operation.

The rendering part 71 performs a rendering processing of the print data. The print processor 72 performs control processing of the print data. Namely, the print processor 72 requests a print data expansion processing to the rendering part 71, and requests a printing to the equipment controller 70 after the print data expansion is completed. Further, the print processor 72 informs it to the data processing exclusive-control part 73 mentioned below that the print is completed and that the operator panel 1-1 is currently in operation.

Meanwhile, the installation controller 20-1 includes a reception firmware controller 74 and firmware storages 22-1, 22-2 and 22-3. Each firmware storages is constituted by a non-volatile storage 22 for storing the firmware, desirably having a capacity of storing more than two versions of the firmware in considering to an abnormal end of the firmware installation.

The firmware storage 22 consists of an installation information table 22-1, a first firmware area 22-3 for storing the firmware currently in operation, and a second firmware area 22-2 for storing the firmware under installation. The firmware installation information table 22-1 retains the firmware version number, the total block number of the installation file (firmware being installed), and the number of bytes and the verification information of each transfer block.

The reception firmware controller 74 performs such functions as deciding the reception firmware version number, controlling of firmware reception and installation information table 22-1. The communication processor 25 performs LAN communication control, and comprises a network interface.

The data processing exclusive-control part 73 decides whether the data transferred from the communication processor (network interface) 25 is a print data or firmware for installation, and supervises the processing condition. When the firmware is being received, the communication processor 25 judges whether or not it is during installation, and transmits an installation interruption/resumption signal and controls an installation interruption flag.

In regard to upper-level apparatus 6 for conducting the installation, a personal computer is normally used. However, it is also possible to use apparatus dedicatedly provided for the installation purpose. When installing, firmware is prepared for installation. This firmware can either be provided in a storage media such as a CD-ROM and a floppy disk, or downloaded from other apparatus through the network. The firmware installation to a printer is conducted using an installation tool 60. An internal structure of upper-level apparatus 6 is shown in FIG. 4.

Firmware storage 61 stores the firmware to be downloaded to printer 4. A firmware transfer controller 64 controls to transfer the firmware to printer 4, as well as to transmit information such as the firmware version number and the size.

An installation interruption/resumption signal controller 65 receives an installation interruption signal or an installation resumption signal from the printer 4 and instructs the interruption or resumption of the firmware installation to the firmware transfer controller 64.

A firmware transfer information storage 66 stores the firm-information that the reception is completed, etc. reported from the printer side. A schedule controller 67, by referring to the information of a transfer information controller 68, initiates the firmware transfer controller 64 based on the set value therein. The transfer information controller 68 retains the set information with respect to the installation time interval and the time of installation. Communication processor 63 performs LAN communication processing.

First Embodiment

Figure 5:
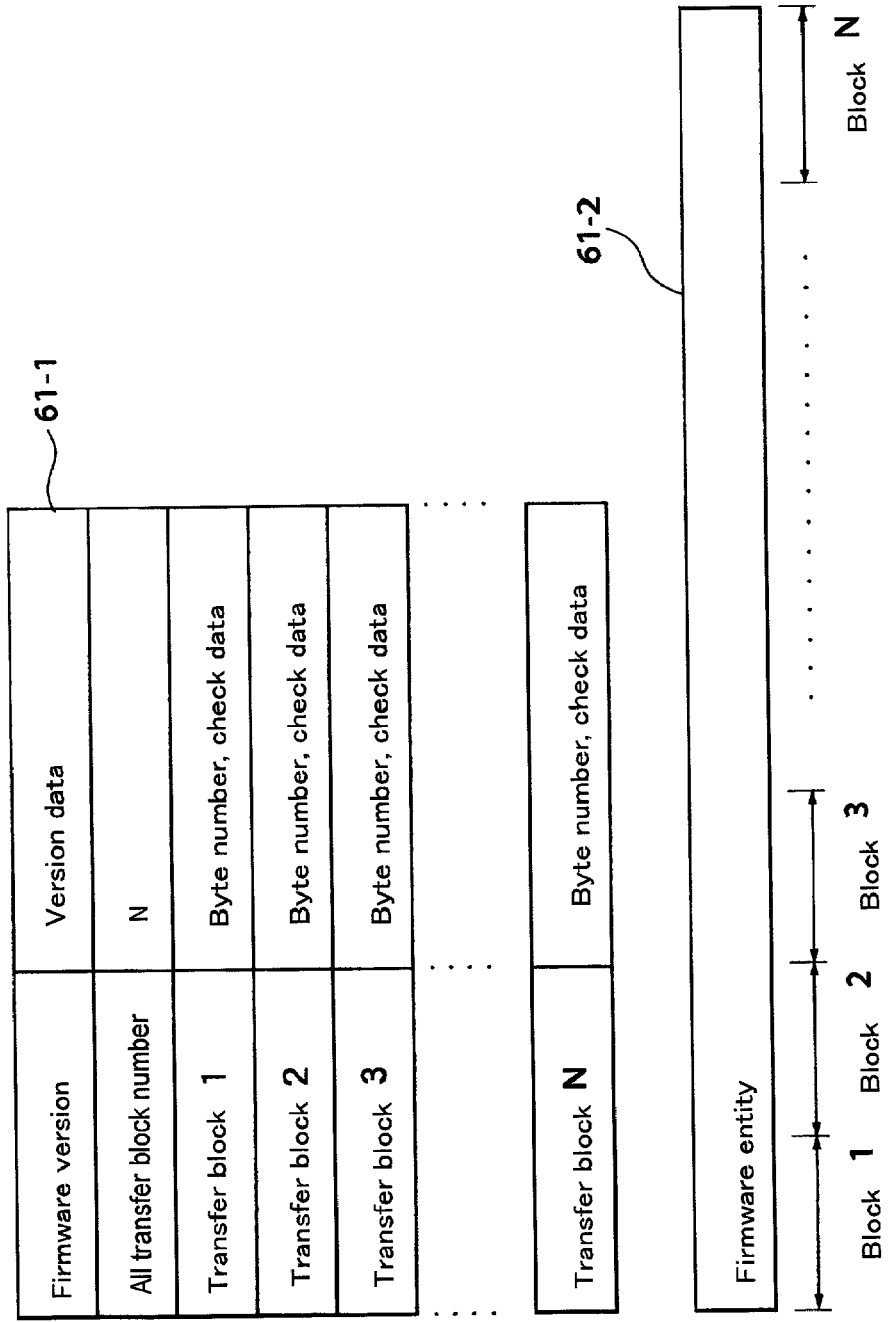
FIG. 5 shows a diagram illustrating a firmware format according to a first embodiment of the present invention.

In FIG. 5, there is illustrated a diagram of the firmware format provided for the firmware installation according to the first embodiment of the present invention. Firmware stored in the firmware storage 61 comprises a management information table 61-1 for judging firmware reception/storage, and a firmware entity 61-2. The management information table 61-1 includes the version number of the firmware, total transfer block number N, the number of bytes of each transfer block 1 to N, and the check data.

In FIG. 6, there is shown an example of installation information table 22-1 in the printer in the case of the firmware format shown in FIG. 5. Also in FIG. 7, there is shown an example of the firmware stored in storage 22-2 of the printer for installation in this case.

As shown in FIG. 6, installation information table 22-1 includes the initiating firmware information, the firmware version, the total transfer block number N, the reception block number I, the guaranteed block number J, the number of bytes in each transfer block 1 to N, and check data.

AS shown in FIG. 7, a storage area for each transfer block 1 to N is assigned in a firmware installation area 22-2 at the time of installation. Also, the management information table 61-1 shown in FIG. 5 is transferred from the upper-level apparatus 6 to the printer 4, thereby the firmware version number, the total transfer block number N, the byte number of each transfer block 1 to N, and the check data are set to the installation information table 22-1 shown in FIG. 6.

Figure 8:
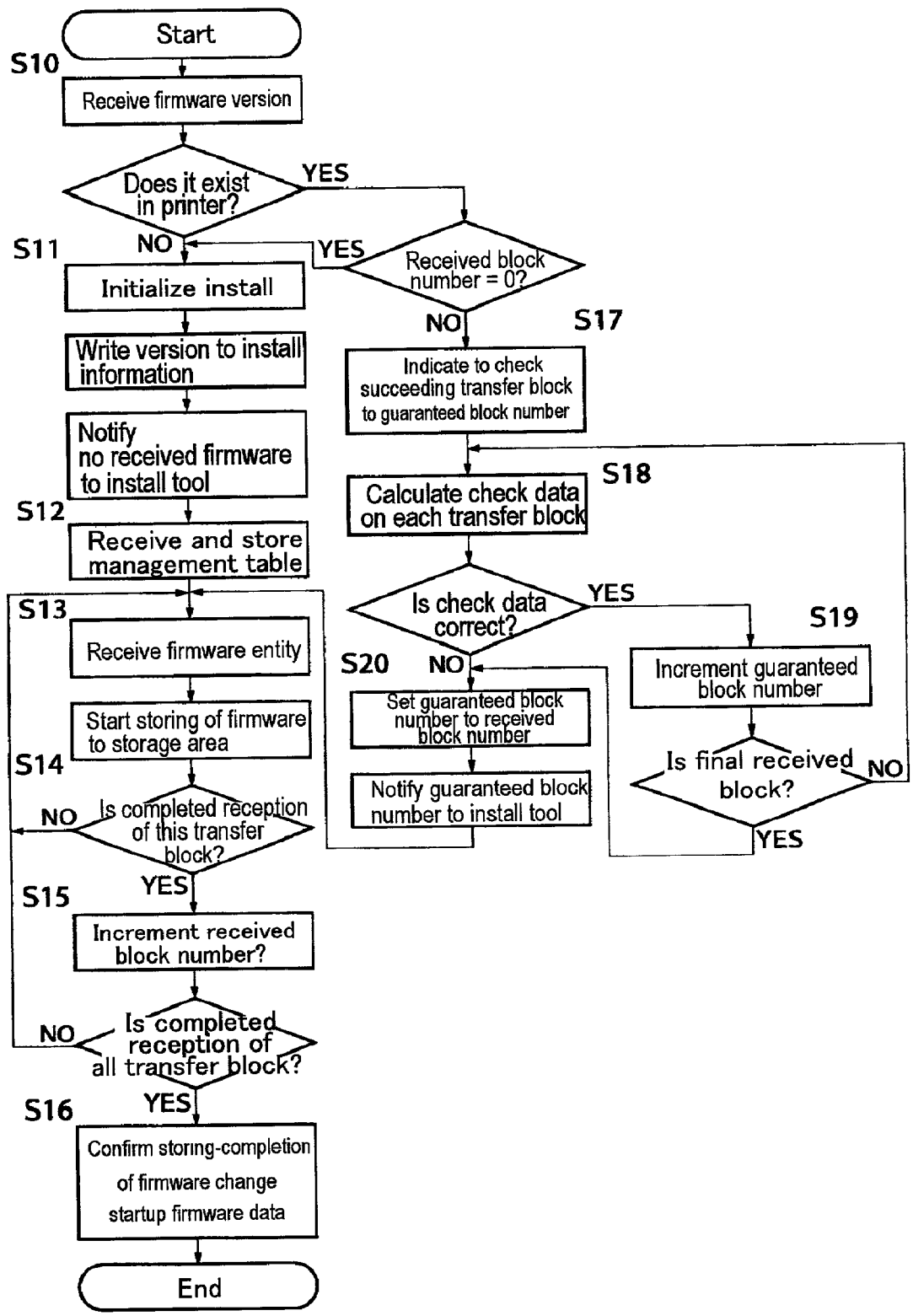
FIG. 8 shows a flowchart of an installation processing in the printer according to the first embodiment of the present invention.

In FIG. 8, there is shown an installation processing flowchart of the printer according to an embodiment of the present invention. In this flowchart, a process carried out in the reception firmware controller 74 is shown.

(S10) The reception firmware controller 74 receives the version number of the firmware from the installation tool 60, and searches in the installation information table 22-1 to check whether firmware having the identical version number already exists in the printer.

(S11) In the case the firmware of the identical version does not exist in the printer, or exists in the form of reception block number I (refer to FIG. 6) equal to zero, the installation information table 22-1 corresponding to the installation area is initialized and the version number newly to be installed is written therein. The reception firmware controller 74 transfers information that the firmware having the identical version does not exist to the installation tool 60.

(S12) On receiving this information, the installation tool 60 sends the management information table 61-1 of the firmware 61 to the printer. As shown in FIG. 5, this management information table 61-1 is constituted by the number N of entire transfer blocks (here, firmware transfer blocks may be configured either with arbitrarily divided files or with files based on program modules), the byte number of each transfer block, and the check data (such as widely used sum check) for checking that the received data have been stored accurately into the storage. On the printer side, the received management information table 61-1 is stored into the installation information table 22-1.

(S13) The installation tool 60 transfers successively from the first block to start the installation of firmware 61-2. On the printer 4, the reception firmware controller 74 counts the byte number of the transfer block while receiving transfer blocks and compares the byte numbers of each block stored in the management information table 61-1. Also, the reception firmware controller 74 starts to store received transfer blocks into the storage (installation area) 22-2.

(S14) The reception firmware controller 74 judges whether or not reception of the transfer blocks is completed from the byte number comparison of the transferred blocks. When the reception of the transfer blocks is not completed, the process returns to step S13.

(S15) When it is decided that the reception of the transfer blocks is normally completed from the aforementioned comparison, the reception block number (I) is incremented by one, then it is checked whether the reception of the entire blocks is completed. When the reception is not completed, the process returns to step S13. When it is decided the reception of a transfer block in not completed normally, retransmission of the block is requested similarly to an ordinary communication procedure.

(S16) When the entire blocks of the firmware are received completely, startup firmware information to be used when starting up the printer, stored in installation information table 22-1, is changed. Namely, the firmware newly installed is set as firmware to be used for the startup procedure, while the firmware 22-3 currently in use is changed not for use in the startup procedure. When starting up the printer, which of the firmware to start is decided according to this information on the startup firmware. Thus a sequence of the installation processing is completed.

(S17) Meanwhile, when an interruption occurred on the way of installation due to power off or the like in the upper-level apparatus or the printer, there exists a portion of the firmware having been installed halfway in the storage 22-2. In such a case, however, the firmware having already been stored in storage 22-2 is possibly not correct (i.e. stored an incorrect data value). The aforementioned decision made on the normality of the received transfer blocks is intended to check that the blocks have been received correctly, not that the blocks have been stored correctly into storage 22-2. Therefore it is necessary to decide to what extent the data are correctly stored in the installation area 22-2.

For this purpose, when there exists the version number of the received firmware and the reception block number (I) is not zero in step S10, it is decided the installation has been interrupted, and the verification is started from the succeeding transfer block of the guaranteed block number (J).

(S18) First, the verification information of the stored blocks (in this case, a sum check) is calculated on each transferred block against data stored in the installation area 22-2. The normality of this verification information is investigated by comparing to the value of the verification information in the management information table 61-1 previously received and stored in the installation information table 22-1. The verification processing to be carried out next time may be started from the succeeding transfer block of the guaranteed block that has been verified normally.

(S19) When the investigation result is normal, the guaranteed block number is incremented by '1', then it is decided whether or not the received block in the installation area 22-2 is the final block using reception block number (I). When the received block is not the final block, the process returns to step S18, else when the received block is the final, the process proceeds to step S20.

(S20) When either the verification result is incorrect or the received block is the final block, the guaranteed block number (J) is set into the reception block number (I) and the guaranteed block number (J) is reported to the installation tool 60. The process then proceeds to step S13.

In such a manner, the printer 4 decides to which transferred block the transfer can be guaranteed and reports the guaranteed block number to the installation tool 60. The installation tool 60 can continue the installation having been interrupted before by resuming the transfer of firmware 61 from the succeeding transfer block of the guaranteed block number having been reported.

Figure 9:
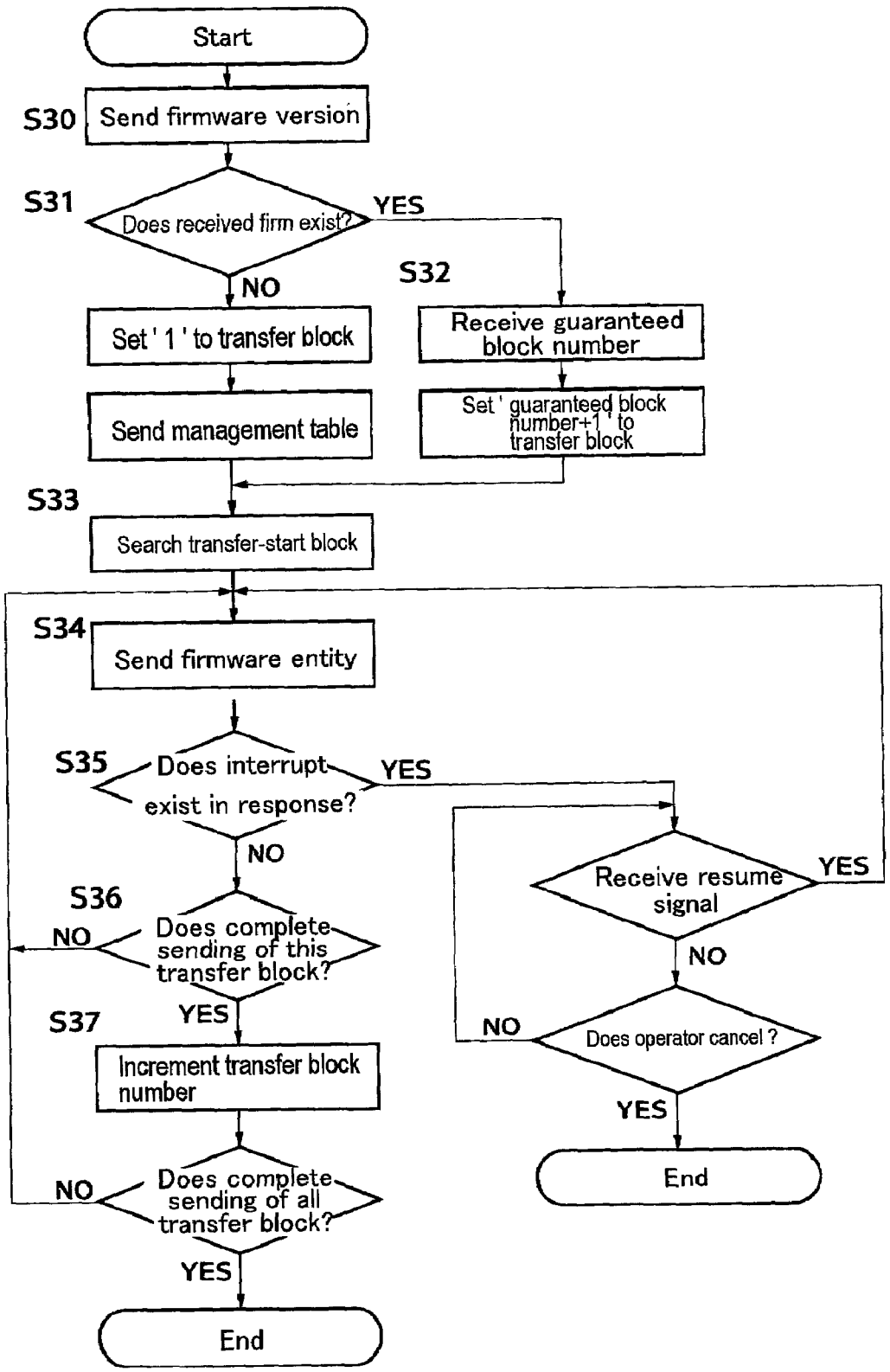
FIG. 9 shows a flowchart of an installation processing of an installation tool provided in the printer management terminal according to the first embodiment of the present invention.

The processing carried out in the installation tool 60 corresponding to the above processing in the printer 4 is described hereafter referring to FIG. 9.

(S30) The installation tool 60 sends the firmware version number to the printer 4.

(S31) The installation tool 60 receives the information from the printer 4 whether or not the firmware having the identical version exists in the printer 4. When the firmware of the identical version does not exist, the transfer block number is initially set to '1' and the management information table 61-1 is sent to the printer 4.

(S32) In the case the firmware of the identical version exists in the printer 4, the installation tool 60 receives the guaranteed block number (J) from the printer 4 and sets 'guaranteed block number (J)+1' into the transfer block number.

(S33) The installation tool 60 searches a transfer start block in the firmware 61.

(S34) The installation tool 60 then transfers sequentially from the first block to start the firmware installation.

(S35) The installation tool 60 decides whether an installation interruption signal is included in the transmission response from the printer 4. When the installation interruption signal is included, the installation tool 60 waits for the reception of an installation resumption signal. When a cancel order is received from an operator on the installation tool 60 while waiting for the installation resumption signal, the procedure is terminated. While, when receiving the installation resumption signal, the process returns to step S34.

(S36) The installation tool 60 judges whether or not sending operation of this transfer block is completed from the number of transfer block bytes. When sending this transfer block is not completed, the process returns to step S34.

(S37) On the other hand, when it is decided this transfer block has been sent, the number of transfer blocks is incremented by '1', and then it is decided whether or not sending operation of the entire transfer blocks are completed. When sending the entire transfer blocks is not completed, the process returns to step S34, while the process is ended on completion of sending entire transfer blocks.

Now, an installation interruption/resumption processing of above printer 4 is described hereafter. When the installation is interrupted due to error conditions such as overload traffic in the network, cable out of connection, and power off in either the management terminal 6 or the printer 4, the installation can be resumed using the aforementioned investigation and report on the guaranteed block number. Additionally, in order to guarantee the installation processing when receiving print data in the printer or operating by the user, the printer actively suspends (interrupts)/resumes the installation. For this purpose a data processing exclusive-control portion 73 is provided.

In FIGS. 10 to 13, there are shown processing flowcharts of an exclusive control performed in the data processing exclusive-control part 73 according to an embodiment of the present invention. First, a main process in the exclusive control processing is described referring to FIG. 10.

(S40) The exclusive-control part 73 judges whether or not data is received from the communication processor 25. When the data is received from the communication processor 25, an installation interruption/resumption processing routine is executed as illustrated later in FIG. 12.

Figure 11:
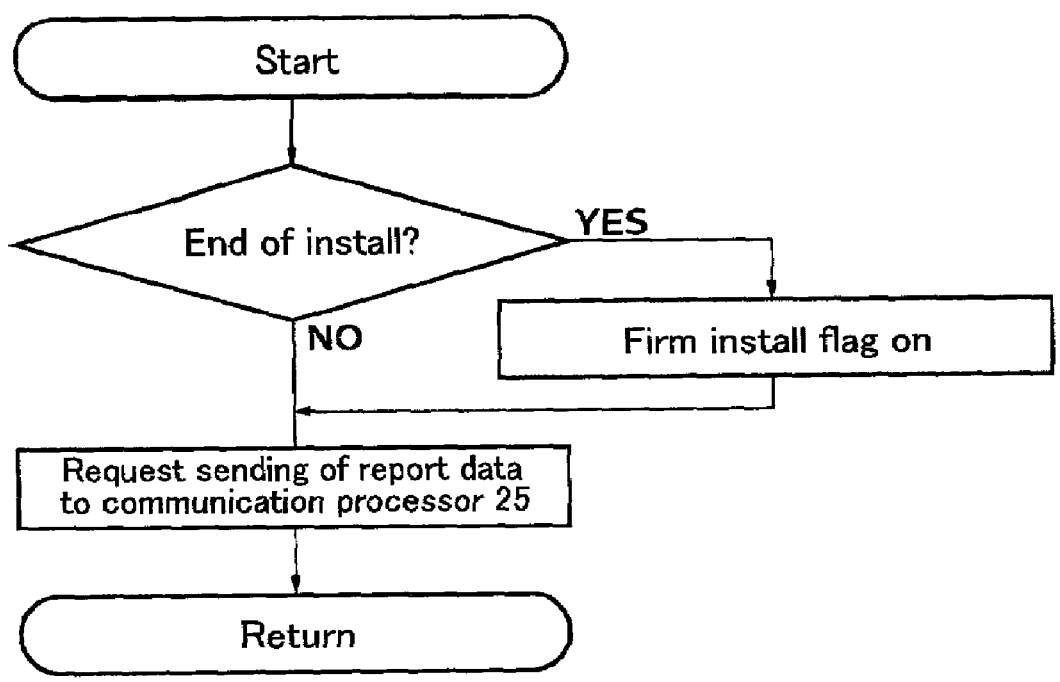
FIG. 11 shows a flowchart for processing a report data from a reception firmware controller shown in FIG. 10.

(S41) On the other hand, when data is not received from the communication processor 25, it is checked whether a report data is received from the reception firmware controller 74. When the report data is received from the reception firmware controller 74, then a report processing routine is executed. Namely, as shown in FIG. 11, whether the report data denotes the completion of installation is checked. When the installation completion is reported, an 'installation in progress' flag indicating a condition that the firmware is currently being installed (as will be explained later) is turned off. The transmission of a report data is then requested to the communication processor 25.

Figure 13:
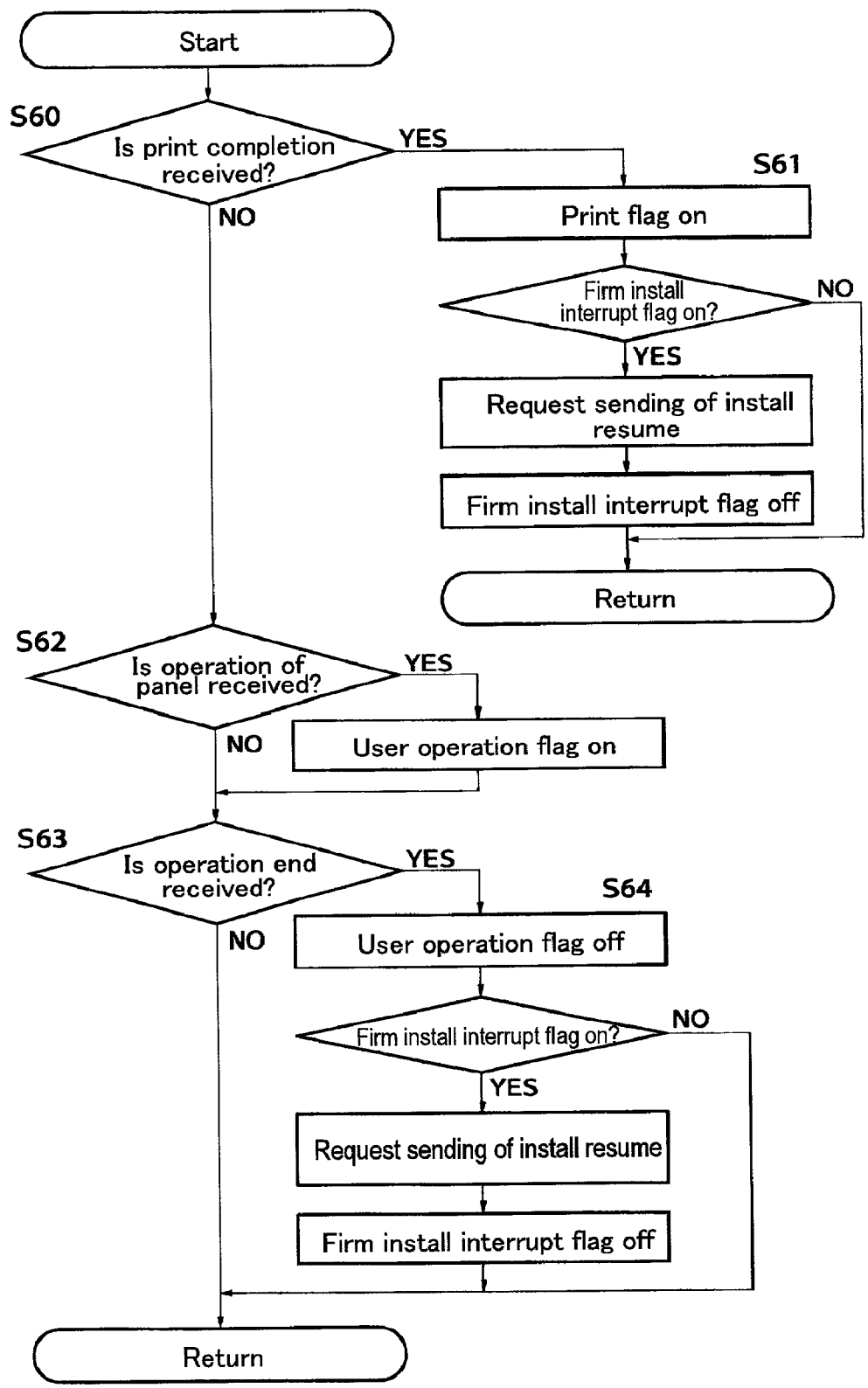
FIG. 13 shows a flowchart for processing a report data from a print processor shown in FIG. 10.

(S42) When there is no report data received from the reception firmware controller 74, it is judged whether or not a report data is received from the print processor 72. When the report data is received, the print processing routine as shown in FIG. 13 is executed, and the process returns to step S40.

Figure 12:
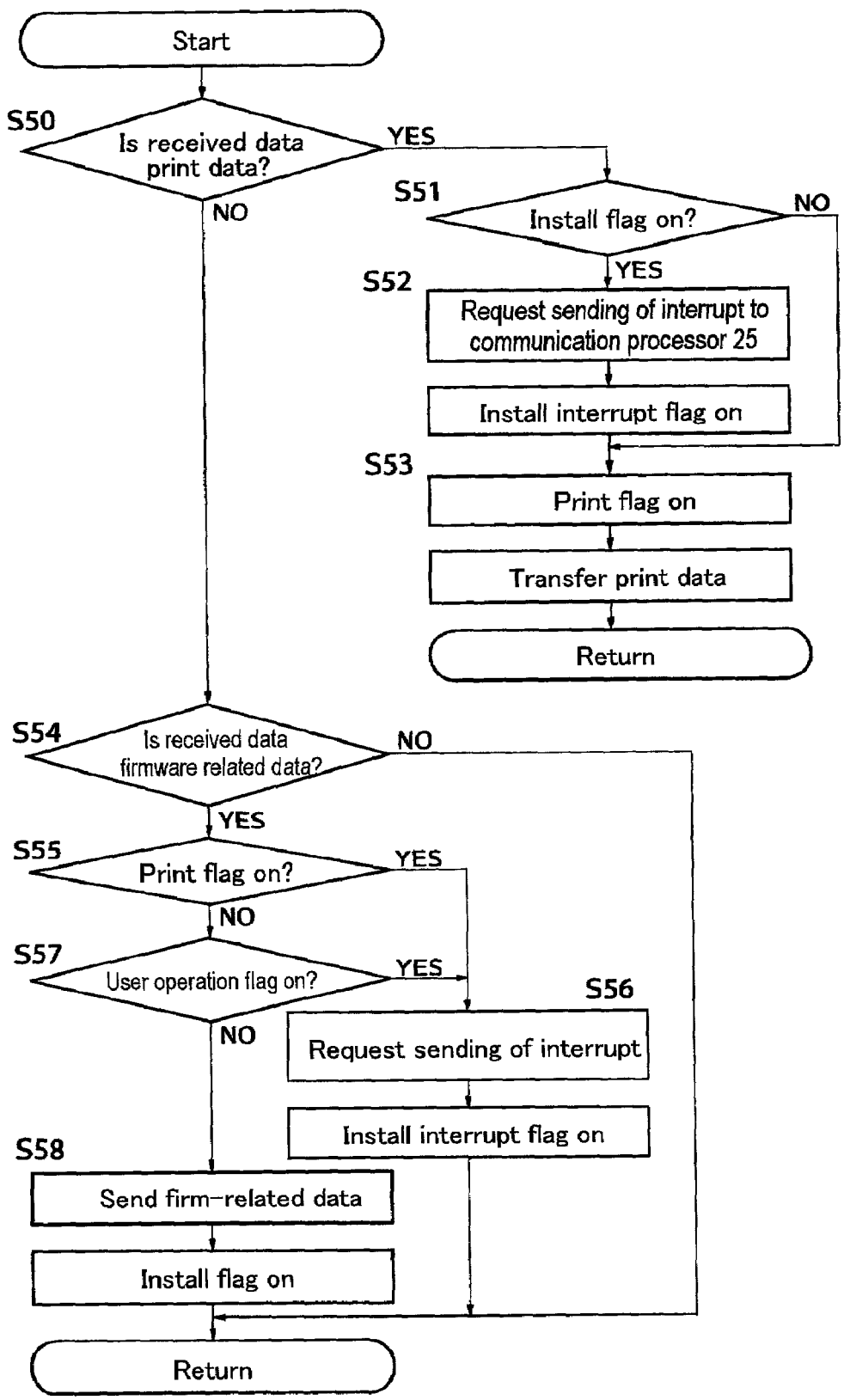
FIG. 12 shows a flowchart for processing a report data from a communication controller shown in FIG. 10.

Now, installation interruption/resumption processing is described hereafter by referring to FIG. 12 described in above step S40.

(S50) It is judged whether or not the received data is a print data.

(S51) In case that the received data is a print data, it is judged whether the 'installation in progress' flag is 'on'. Here, the 'installation in progress' flag indicates whether or not the installation is being carried out, being set 'on' at the start of installation and being set 'off' at the completion of installation. When the 'installation in progress' flag is off (i.e. the installation is not being carried out), then the process proceeds to step S53.

(S52) When the 'installation in progress' flag is on (i.e. the installation is being carried out), a sending request for a firmware installation interruption signal is forwarded to the communication processor 25. Thus a transmission response, which may include the interruption signal shown in FIG. 9, is sent to the installation tool 60 in the upper-level apparatus 6. Thereafter, the 'installation interrupted' flag is then set on. This 'installation interrupted' flag indicates the firmware installation is being interrupted.

(S53) When the installation is not in progress or being interrupted, a printing flag is set on. The printing flag indicates that printing is in progress. Next, the data processing exclusive-control part 73 transfers print data to the print processor 72. On receiving the print data, the print processor 72 performs print processing, as mentioned earlier, thereby executing print operation.

(S54) On the other hand, in the case the received data is not a print data, it is judged whether or not the received data is a firmware related data (a firmware management table or a firmware entity). When the received data is not a firmware related data, the process returns to FIG. 10.

(S55) When the received data is a firmware related data, whether the printing flag is on is checked.

(S56) In case the printing flag is on, a sending operation of a firmware installation interruption signal is requested to the communication processor 25, because the print processing is being carried out. Thereby, a transmission response including the interruption signal is sent to the installation tool 60 in the upper-level apparatus 6, as illustrated in FIG. 9. Thereafter, the firmware 'installation interrupted' flag is then set on and the process returns to FIG. 10.

(S57) In case the printing flag is not on, it is checked whether or not a user operation flag is on. Here, the user operation flag indicates that the user is currently operating the printer using the operation panel, etc. When the user operation flag is on, because the user is operating the operation panel, etc., the process proceeds to step S56.

Figure 10:
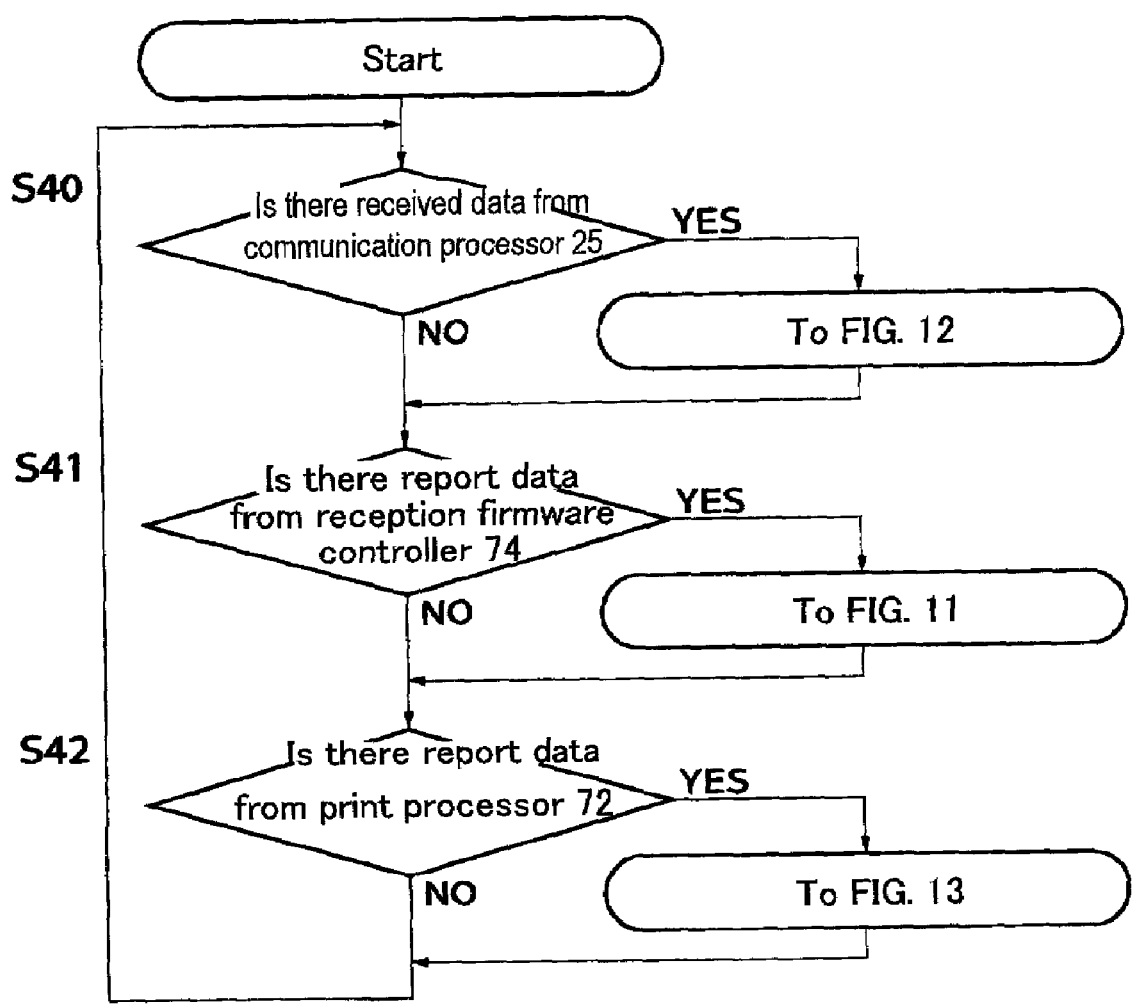
FIG. 10 shows a flowchart of an exclusive control processing according to the first embodiment of the present invention.

(S58) On the other hand, when the user operation flag is not on, the exclusive control part 73 send data related to the firmware to the reception firmware controller 74 and the 'firmware installation in progress' flag is set on, and the process returns to FIG. 10.

In such a manner, the exclusive control is carried out for the reception data from the communication processor 25 depending on the reception data type. Priority is given to the print processing or the processing for operation while the installation is being carried out. Thus the printer can control the interruption/resumption of the installation.

Now, a processing for a report data from the print processor shown in FIG. 10 is described below referring to FIG. 13.

(S60) The data processing exclusive-control part 73 discriminates report data type received from the print processor 72. First, whether the report data is a print completion report is checked.

(S61) When the report data is the print completion report, the printing flag is set off, because printing is completed. And then whether the 'installation interrupted' flag is on is checked. When the 'installation interrupted' flag is not on, the process returns to FIG. 10, because the installation is not interrupted. On the other hand, when the 'installation interrupted' flag is on, the exclusive-control part 73 requests to send the firmware installation resumption signal to the communication processor 25. Thereby, the communication processor 25 sends a transmission response including the resumption signal shown in FIG. 9 to the installation tool 60 in upper-level apparatus 6. Thereafter, the firmware installation interrupted flag is then set off, and the process returns to FIG. 10.

(S62) When the report data is not the print completion report, whether the report data is a report of the operation panel being in operation is checked. When the report is the operation panel being in operation, the user operation flag is set on.

(S63) When the report data is not a report of the operation panel in operation, whether the report data is a report of an operation completion of the operation panel is checked. When the report is not the report of the operation completion of the operation panel, the process returns to FIG. 10.

(S64) When the report data is the report of the operation completion of the operation panel, the user operation flag is set off. Next, whether the firmware installation interrupted flag is on is checked. When the firmware installation interrupted flag is not on, the process returns to FIG. 10, because the installation is not interrupted. On the other hand, when the firmware installation interrupted flag is on, the exclusive control part 73 requests to send firmware installation resumption report to the communication processor 25. Thereby, the communication processor 25 sends a transmission response including the resumption signal shown in FIG. 9 to the installation tool 60 in the upper-level apparatus 6. Thereafter, the firmware installation interrupted flag is then set off, and the process returns to FIG. 10.

In such a manner, the installation resumption is controlled according to the print completion or the operation of the operation panel.

Second Embodiment

In FIG. 14, there is illustrated a firmware format for the method of installing firmware according to the second embodiment of the present invention. Firmware 61 of the embodiment shown in FIG. 5 is separately configured with management information table 61-1 for discriminating firmware reception/storage and firmware entity 61-2. In this second embodiment, the table 61-1 and firmware entity 61-2 are configured integrally.

More specifically, as shown in FIG. 14, each transfer block 1 to N is constituted by the number of bytes, a check data and each firmware entity 1 to N. Further, the version number of the firmware and the total transfer block number are added in the top transfer block.

In the case of firmware format shown in FIG. 14, an installation information table 22-1 in the printer is configured as shown in FIG. 6, and also an example of installation firmware stored in the printer storage 22-2 is configured as shown in FIG. 7.

Namely, when each transfer block shown in FIG. 14 is transferred, the version number, the total transfer block number the byte number of each transfer block, and the check data corresponding to management information table 61-1 in FIG. 5 are extracted. Next, the version number, the total transfer block number N, the byte number of each transfer block 1 to N, and the check data are set into installation information table 22-1 shown in FIG. 6.

Figure 15:
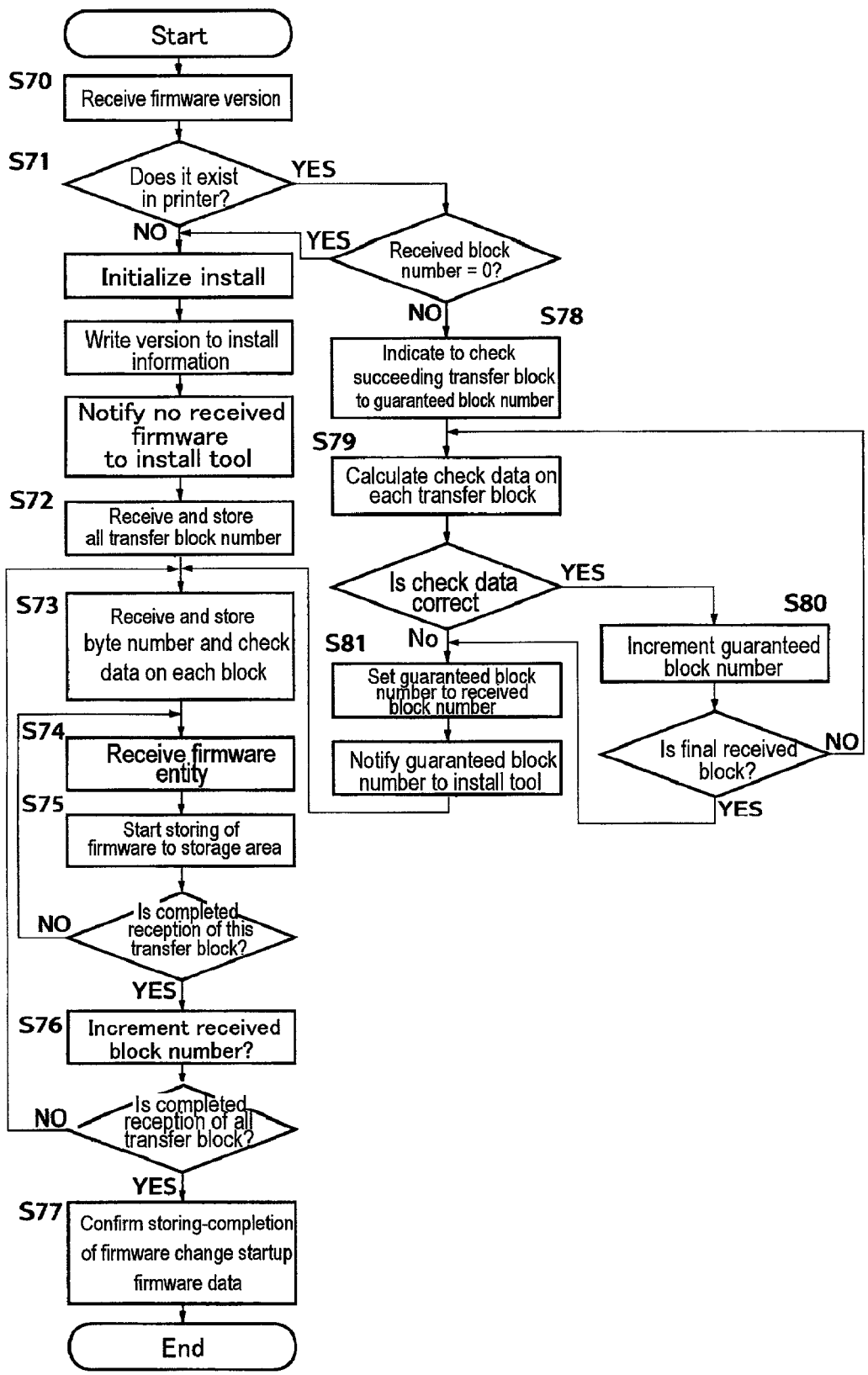
FIG. 15 shows a flowchart of an installation processing in the printer according to the second embodiment of the present invention.

In FIG. 15, there is shown an installation processing flowchart of the printer according to the second embodiment of the present invention. In this flowchart, a process carried out in the reception firmware controller 74 is shown.

(S70) The reception firmware controller 74 receives the version number of the firmware from the installation tool 60, searches in the installation information table 22-1, and checks whether the firmware having the identical version number already exists in the printer.

(S71) In the case the firmware of the identical version does not exist in the printer, or exists in the form of reception block number I (refer to FIG. 6) being equal to zero, the installation information table 22-1 corresponding to the installation area is initialized. The version number newly to be installed is then written therein. The reception firmware controller 74 transfers a report that no firmware having the identical version exists to the installation tool 60.

(S72) On receiving this information, the installation tool 60 transfers the entire transfer block number N (here, each firmware transfer block may be configured with either the arbitrarily divided file or the file based on the program module). The printer 4 stores the received entire transfer block number N into the installation information table 22-1.

(S73) The installation tool 60 transfers successively from the first block to start the firmware installation. On the printer 4, the reception firmware controller 74 receives the transferred blocks, judges the end of each transfer block, extracts the byte number of each block and the check data (such as sum check information generally in use) for determining to have stored correctly in the storage at a receiving side, and stores the extracted data into the installation information table 22-1.

(S74) The reception firmware controller 74 then counts the byte number of each received block of the firmware entity and compares to each byte number of each block in the firmware installation information table 22-1 which was previously received. The reception firmware controller 74 starts to store received transfer blocks into a corresponding storage area (installation area) 22-2.

(S75) The reception firmware controller 74 judges the completion of receiving the transfer blocks by comparing the byte number of the transferred blocks. When the reception of the transfer blocks is not completed, the process returns to step S74.

(S76) When it is decided that the reception of the transfer blocks is normally completed by the aforementioned comparison, the reception block number (I) is incremented by '1', then it is checked whether the reception of the entire blocks is completed. When the reception is not completed, the process returns to step S73. Here, when it is judged that the reception of a transfer block in not completed normally, retransmission of the block is requested in a similar manner to a communication procedure generally in use.

(S77) When the entire blocks are received completely, startup firmware information stored in installation information table 22-1 is changed. Namely, the firmware newly installed is set as the firmware to be used for startup, while the firmware 22-3 currently in use is set as the firmware not to be used for startup. When starting up the printer, which of the firmware to start is decided according to this startup firmware information. Thus a sequence of the installation processing is completed.

(S78) Meanwhile, when the installation is interrupted on the way due to power off, or the like, on the upper-level apparatus or the printer, there exists a portion of firmware installed halfway in the storage 22-2. In such a case the data of the firmware may not be stored correctly in the storage 22-2 (i.e. incorrect data value is included). The aforementioned judgment made on the normality of the received transfer blocks is to check that the blocks have been received correctly, not that the blocks have been stored correctly into the storage 22-2. Therefore it is necessary to check to which part the data are correctly stored in the installation area 22-2.

For this purpose, when there exists the version number of the received firmware and the reception block number (I) is not 'zero' in step S70, it is decided the installation has been interrupted, and the verification check is started from the succeeding transfer block of the guaranteed block number (J).

(S79) First, the verification information of the stored blocks (in this case, a sum check) is calculated for each stored block in the installation area 22-2. The normality of this verification information is investigated by comparing to the value of the previously received verification information (in the firmware installation information table 22-1). The verification processing to be carried out next time may be started from the succeeding transfer block of the guaranteed block the normality of which has been verified.

(S80) When the verification result is normal, the guaranteed block number is incremented by '1', then it is checked whether or not the verification block is a final block of the received blocks in the installation area 22-2 using reception block number (I). When the verification block is not the final block, the process returns to step S79, else when the verification block is the final block, the process proceeds to step S81.

(S81) When either the verification result is incorrect or the verification block is the final block, the guaranteed block number (J) is set into the reception block number (I) and the guaranteed block number (J) is reported to the installation tool 60. The process then proceeds to step S73.

In such a manner, as in the case of the first embodiment, the printer 4 judges to which transferred block the transfer is guaranteed, reports the guaranteed block number to the installation tool 60. The installation tool 60 can continue the installation having been interrupted before by transferring the blocks from the succeeding transfer block of the guaranteed block number having been reported.

In addition, in this embodiment, the processing in the installation tool 60 is identical to that shown in FIG. 9. Further, when it becomes possible to resume the installation, the installation resumption signal is sent from the printer. By including the guaranteed block signal in this installation resumption signal, it is also possible for the installation tool side to guarantee the data normality by comparing the information in the interrupted signal with the information in the resumption signal. On completion of comparing the information, when the normality is proved, the installation tool resumes to transfer the firmware.

Other Embodiments

In the other embodiment, there is provided a function of setting installation processing time in installation tool 60 added to the aforementioned first and second embodiments, which is an installation interval management function aiming at interrupting/resuming the installation at regular intervals. In the installation tool 60, the installation of a predetermined amount (in terms of installation time, file size, etc.) is carried out at a predetermined interval. The installation is suspended when above predetermined amount is installed.

On the printer 4 side, the installation interruption processing is carried out in a similar manner to the processing carried out in the first and second embodiments. When the installation is resumed, the printer 4 reports the information on the guarantee range against an inquiry from the installation tool 60, thus a continued installation becomes possible.

Similarly, in still another embodiment, there is provided a function of setting installation execution start time in the installation tool 60 being added to the first and second embodiments, which is an installation time management function aiming to interrupt or resume the installation at a predetermined absolute time. On the installation tool 60, the installation is started at the predetermined absolute time to perform installation processing for a predetermined amount (in terms of installation time, file size, etc.) The installation is interrupted when the designated amount is completed.

On the printer 4 side, the installation interruption processing is carried out in a similar manner to the processing carried out in the first and second embodiments. When the installation is resumed, the printer 4 reports the information on the guarantee range against an inquiry from the installation tool 60, thus a continued installation becomes possible.

Still further, as another embodiment, there is provided a function in the installation tool 60 that supervises network load conditions aiming to interrupt and resume the installation automatically depending on network load condition. On the installation tool 60, the installation is started when a low load condition is detected as a result of the load supervision. When a high network load condition is detected during the installation, the installation operation may be interrupted.

On the printer 4 side, the installation interruption processing is carried out in a similar manner to the processing carried out in the first and second embodiments. When the installation is resumed, the printer 4 reports the information on the guarantee range against an inquiry from the installation tool 60, thus a continued installation becomes possible.

The printer according to the present invention functions printing data onto a print medium, the media can be one of separate form, continuous form or duplication form. Further, as storage 22 for storing the printer firmware, it is possible to use non-volatile storage equipment other than the hard disk, such as a flash memory. In regard to the check data, it is also possible to apply other block data check schemes than the above-mentioned sum check scheme. Moreover, the check data for checking the guarantee range of the received firmware may also be used for the reception completion check.

The effects of the present invention are summarized as follows: In a printer to which firmware is installed, when an interruption occurs during the installation, the guarantee range of the received data is automatically detected in the printer to report to the installation tool side. This enables to interrupt and resume the installation work without awareness by an operator.

Accordingly, the operator can use the printer at any time for normal jobs and can switch the printer power off and on, whenever desired. Also, even if these operation produces an installation interruption, the firmware having been installed halfway before the interruption remains effective, enabling to shorten the time for re-installation.

The foregoing description of the embodiments is not intended to limit the invention to the particular details of the examples illustrated. Any suitable modification and equivalents may be resorted to the scope of the invention. All features and advantages of the invention that fall within the scope of the invention are covered by the appended claims.

What is claimed is:

1. A printer firmware installation method for installing firmware from an upper-level apparatus to a printer through a network comprising the steps of:
    receiving each block of said firmware consisting of a plurality of blocks;
    storing said each received block to a memory;
    judging a guarantee range of the installed blocks using the data stored in said memory when resuming said installation after an interruption of said installation by using a check sum for checking that received data has been accurately stored for each installed block;
    informing said judged guarantee range to said upper-level apparatus to resume said installation;
    informing an installation interruption to said upper-level apparatus from said printer;
    informing an installation resumption to said upper-level apparatus from said printer; and
    printing print data and interrupting said installation when receiving said print data and informing said upper-level apparatus of said interruption signal.

2. The printer firmware installation method according to claim 1, further comprising the step of:
    resuming to install said firmware to said printer from the succeeding transfer block of the guarantee range in accordance with said guarantee range.

3. The printer firmware installation method according to claim 1, wherein said receiving step comprises a step of receiving firmware management information and each block of the firmware entity,
    and wherein said judging step comprises a step of judging said guarantee range of said installed blocks using said received management information and data stored in said memory.

4. The printer firmware installation method according to claim 3, wherein said receiving step comprises:
    a first reception step of receiving said firmware management information; and
    a second reception step of receiving said each block of the firmware entity,
    and wherein said judging step comprises a step of judging said guarantee range of said installed blocks using said received management information and data stored in said memory.

5. The printer firmware installation method according to claim 3, wherein said receiving step comprises a step of receiving blocks each consisting of firmware management information on said each firmware block and the firmware entity,
    and wherein said judging step comprises a step of judging said guarantee range of said installed blocks using management information extracted from said each received block and data stored in said memory.

6. A printer for printing data to print medium based on control according to a firmware comprising:
    memory that stores said firmware;
    communication unit that receives each block of said firmware consisting of a plurality of blocks from a upper-level apparatus; and
    processor that processes said received block, storing into said memory,
    wherein, said processor judges a guarantee range of the installed blocks using a data stored in said memory when resuming said installation after an interruption of said installation by using a check sum for checking that received data has been accurately stored for each installed block, and informs said upper-level apparatus of said guarantee range to resume said installation;
    wherein said processor informs said upper-level apparatus of an installation interruption signal; and informs said upper-level apparatus of an installation resumption signal; and
    wherein said processor starts to print said print data and interrupts said installation when receiving a print data, and informs said upper-level apparatus of said interruption signal.

7. The printer according to claim 6,
    wherein said communication unit receives firmware management information and each block of the firmware entity, and
    said processor judges a guarantee range of said installed blocks using said received firmware management information and data stored in said memory.

8. The printer according to claim 7,
    wherein said processor stores said received firmware management information into said memory, receives each block of the firmware entity, and judges said guarantee range of said installed blocks using said received firmware management information and data stored in said memory.

9. The printer according to claim 7,
    wherein said processor receives blocks each comprising of firmware management information on said each firmware block and the firmware entity; extracts said firmware management information to store into said memory; and judges said guarantee range of said installed blocks using said firmware management information extracted from said each received block and data stored in said memory.

10. A printer system comprising:
a printer for printing according to a print order received through a network; and
upper-level apparatus for installing firmware to said printer through said network,
wherein said printer comprises:
memory that stores said received firmware consisting of a plurality of blocks;
communication unit that receives each block of said firmware consisting of a plurality of blocks from said upper-level apparatus; and
processor that processes said received block and storing into said memory after the reception,
wherein said processor judges a guarantee range of the installed blocks using a data stored in said memory when resuming said installation after an interruption of said installation by using a check sum for checking that received data has been accurately stored for each installed block, and informs said upper-level apparatus of said guarantee range,
wherein said upper-level apparatus restarts to install said firmware from the succeeding transfer block of said guarantee range;
wherein said processor informs said upper-level apparatus of an installation interruption signal; and informs said upper-level apparatus of an installation resumption signal; and
wherein said processor starts to print said print data and interrupts said installation when receiving a print data, and informs said upper-level apparatus of said interruption signal.

11. The printer system according to claim 10, wherein said upper-level apparatus sends firmware management information and said each block of the firmware entity to said printer; and
said printer judges said guarantee range of said installed blocks using said received firmware management information and data stored in said memory.

12. The printer system according to claim 11, wherein said upper-level apparatus sends said firmware management information; and then sends said each block of the firmware entity; and
said printer judges said guarantee range of said installed blocks using said received firmware management information and data stored in said memory.

13. The printer system according to claim 11, wherein said upper-level apparatus sends blocks each consisting of said firmware management information on each firmware block and the firmware entity; and
said printer judges said guarantee range of said installed blocks using said firmware management information extracted from said received block and data stored in said memory.

14. The printer system according to claim 10, wherein said upper-level apparatus interrupts said installation according to an interruption signal received from said printer; and resumes said installation according to a resumption signal received from said printer.

15. The printer system according to claim 14, wherein said printer starts to print said print data when detecting to receive print data; and informs said upper-level apparatus of said interruption signal.

16. The printer system according to claim 14, wherein said printer performs a processing corresponding to a printer operation in response with said printer operation; and informs said upper-level apparatus of said interruption signal.

17. A printer for printing data to print medium based on control according to a firmware comprising:
memory that stores said firmware;
communication unit that receives each block of said firmware consisting of a plurality of blocks from a upper-level apparatus; and
processor that processes said received block, storing into said memory,
wherein, said processor judges a guarantee range of the installed blocks using a data stored in said memory when resuming said installation after an interruption of said installation by using a check sum for checking that received data has been accurately stored for each installed block, and informs said upper-level apparatus of said guarantee range to resume said installation;
wherein said processor informs said upper-level apparatus of an installation interruption signal; and informs said upper-level apparatus of an installation resumption signal; and
wherein said processor performs a processing corresponding to a printer operation and interrupts said installation when detecting said printer operation; and informs said upper-level apparatus of said interruption signal.

18. A printer firmware installation method for installing firmware from an upper-level apparatus to a printer through a network comprising the steps of:
receiving each block of said firmware consisting of a plurality of blocks;
storing said each received block to a memory;
judging a guarantee range of the installed blocks using the data stored in said memory when resuming said installation after an interruption of said installation by using a check sum for checking that received data has been accurately stored for each installed block;
informing said judged guarantee range to said upper-level apparatus to resume said installation;
informing an installation interruption to said upper-level apparatus from said printer;
informing an installation resumption to said upper-level apparatus from said printer; and
processing corresponding to a printer operation and interrupting said installation when detecting said printer operation and informing said upper-level apparatus of said interruption signal.

19. A printer system comprising:
a printer for printing according to a print order received through a network; and
upper-level apparatus for installing firmware to said printer through said network,
wherein said printer comprises:
memory that stores said received firmware consisting of a plurality of blocks;
communication unit that receives each block of said firmware consisting of a plurality of blocks from said upper-level apparatus; and
processor that processes said received block and storing into said memory after the reception, wherein said processor judges a guarantee range of the installed blocks using a data stored in said memory when resuming said installation after an interruption of said installation by using a check sum for checking that received data has been accurately stored for each installed block, and informs said upper-level apparatus of said guarantee range, wherein said upper-level apparatus restarts to install said firmware from the succeeding transfer block of said guarantee range;

wherein said processor informs said upper-level apparatus of an installation interruption signal; and informs said upper-level apparatus of an installation resumption signal; and wherein said processor performs a processing corresponding to a printer operation and interrupts said installation when detecting said printer operation; and informs said upper-level apparatus of said interruption signal.

* * * * *